United States Patent [19]

Scheffel

[11] Patent Number: 4,918,545
[45] Date of Patent: Apr. 17, 1990

[54] DISK CLAMP FOR RIGID DISK FILE WITHOUT RADIAL LOAD

[75] Inventor: John N. Scheffel, San Jose, Calif.

[73] Assignee: International Business Machines Corporation, Armonk, N.Y.

[21] Appl. No.: 262,418

[22] Filed: Oct. 25, 1988

[51] Int. Cl.⁴ ............................................. G11B 17/02
[52] U.S. Cl. ............................ 360/98.08; 360/99.12; 369/270
[58] Field of Search ............... 360/98.01, 98.02, 98.07, 360/98.08, 99.04, 99.05, 99.08, 99.12; 369/270, 271

[56] References Cited

U.S. PATENT DOCUMENTS

| | | | |
|---|---|---|---|
| 3,587,073 | 6/1971 | Ghose et al. | 340/174.1 R |
| 4,065,799 | 12/1977 | Kaczeus | 360/135 |
| 4,672,488 | 6/1987 | Wright | 360/98 |
| 4,764,828 | 8/1988 | Gollbach | 360/98.08 |
| 4,791,624 | 12/1988 | Stinesen | 369/270 |

OTHER PUBLICATIONS

Pocock, "Bistable Disk Clamp to Apply Axial Force", IBM Technical Disclosure Bulletin, vol. 29, No. 10, Mar. 1987, pp. 4346-4347.
Allen, et al., "Zero Droop Disk Clamping Assembly", IBM Technical Disclosure Bulletin, vol. 26, No. 10B, Mar. 1984, pp. 5444-5446.
Beuch et al., "Spider Collet For Flexible Magnetic Disks", IBM Technical Disclosure Bulletin, vol. 20, No. 6, Nov. 1977, pp. 2376-2377.

Primary Examiner—David J. Severin
Attorney, Agent, or Firm—Henry E. Otto, Jr.

[57] ABSTRACT

A clamp includes an annular member that acts through a spacer ring to clamp a stack of rigid disks in spaced parallel relationship to a hub having a portion supporting the lower end of the stack. The annular member has a plurality of uniformly spaced radial slots to define a plurality of substantially identical tapered leaf springs. Each leaf spring terminates at its wider end in a common solid hoop-shaped rim that overhangs and contacts the spacer ring along a circular line in the same horizontal plane as, and near, the centroid of the cross-sectional area of the rim when the clamp is uncompressed. Upon application of a compressive force in an axial direction concurrently to the small innermost ends of all said leaf springs, the rim pivots at and along said circular line to substantially eliminate radial load transmitted via the spacer ring to the top disk when clamping the stack to the hub. A minimal spring constant results from substantially uniform stress distribution across and along each tapered leaf spring.

10 Claims, 2 Drawing Sheets

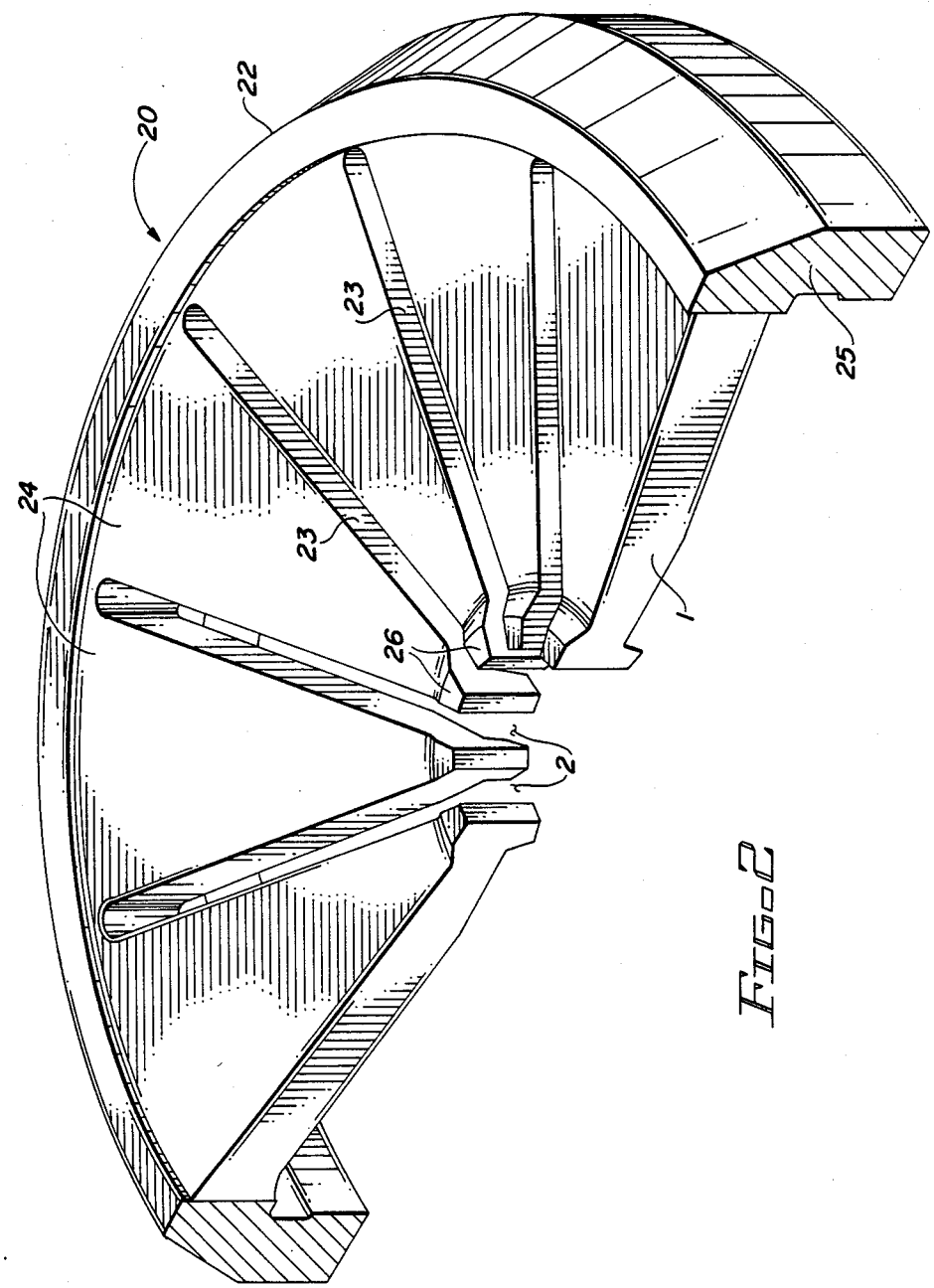

DISK CLAMP FOR RIGID DISK FILE WITHOUT RADIAL LOAD

BACKGROUND OF THE INVENTION

This invention relates to a rigid magnetic disk file, and more particularly relates to a clamp and method for clamping a stack of rigid disks with interleaved spacers to a hub and spindle to form a rigid disk file in which radial load is substantially eliminated.

All rigid disk drives comprise a disk clamp to provide a compressive load on the disk stack to hold the disks in place. These clamps have a wide variety of configurations. Generally, they are a disk or bell-shaped part that acts as a spring and is compressed by screws or bolts.

As rigid magnetic disks become smaller in diameter and track density increases, it is essential that the disks be maintained in parallel relationship to provide proper transducing between the read/write heads and disk recording surface. If the clamp imposes a radial load on the disk stack, it can cause distortion and droop of the disks. This, in turn, can cause misalignment of the heads and produce errors due to skew, missing bits, bit shift and/or signal distortion.

To avoid such distortion, the disk file should be assembled using a clamp that applies a purely compressive load. The clamp should also have a low spring constant to minimize variations in the load on the stack due to tolerance buildup and due to changes in stack dimensions with temperature.

U.S. Pat. Nos. 3,587,073; 4,065,799; and 4,672,488 disclose various disk clamp configurations. The IBM Technical Disclosure Bulletin in the March 1987 issue at p. 4346, and in the November 1977 issue at p. 2376, and in the March 1984 issue at p. 5444 disclose still other configurations. These constitute the most pertinent prior art known to applicants. None, however, discloses or suggests a clamp having the improved configuration disclosed and claimed herein.

There is a need for a rigid disk file clamp having a configuration that provides a low spring constant and that substantially eliminates radial distortion and load on the disk pack.

SUMMARY OF THE INVENTION

Toward this end, and according to the invention, a clamp is provided that comprises an annular member having a plurality of uniformly spaced radial slots to define a plurality of identical tapered leaf springs. Each leaf spring terminates at its wider end in a common solid hoop-shaped rim. This rim overhangs and contacts a spacer ring atop the top disk of the stack. Contact is along a circular line in the same horizontal plane as, and very near, the centroid of the cross-sectional area of the rim when the clamp is uncompressed. When an axial compressive force is applied concurrently to the small innermost ends of all the leaf springs, the rim pivots and twists inwardly at said circular line to substantially eliminate radial load transmitted to the stack and clamps the stack to the hub. A nut operatively bears on the innermost ends of the leaf springs to maintain the springs under compression and secure the stack and hub to a drive spindle.

A BRIEF DESCRIPTION OF THE DRAWINGS

FIG. 2 is a perspective view to enlarged scale of a disk clamp embodying the invention.

DESCRIPTION OF PREFERRED EMBODIMENT

Figure 1:
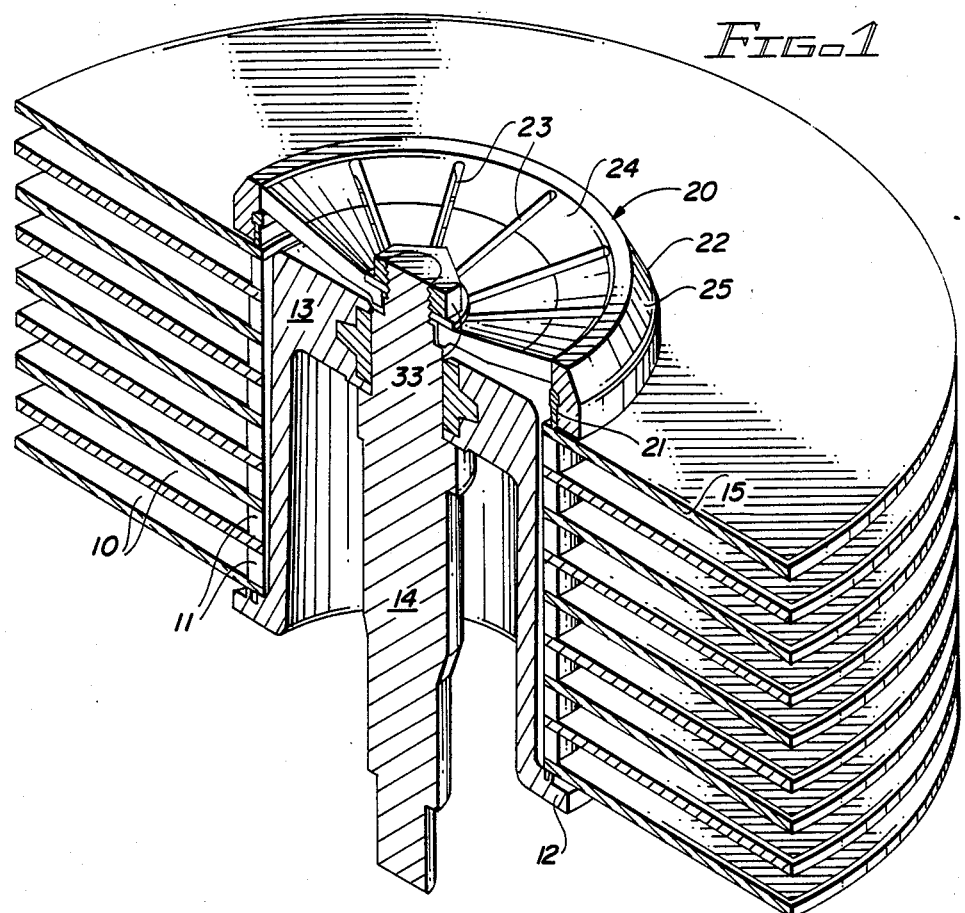
FIG. 1 is a sectional view of a rigid disk file embodying the invention.

As illustrated in FIG. 1, the rigid disk file embodying the invention comprises a stack of rigid disks 10 separated by interleaved spacers 11. The stack is supported at its lower end by a flange 12 forming part of a hub 13 that surrounds and is press fit onto and driven by a spindle 14. A clamp 20 acts through a top spacer ring 21 and the top disk of the stack to clamp the latter to hub 13.

According to the invention and as illustrated in FIG. 2, clamp 20 comprises a unitary annular member 22 having a plurality of uniformly spaced radial slots 23 to form a plurality of identical tapered leaf springs 24. Each leaf spring is cantilevered inward from a common hoop-shaped rim 25. The leaf of each spring 24 is configured to provide a substantially uniform stress distribution across and along the leaf. This configuration, including the taper, provides maximum vertical deflection for a preselected load and allowable stress level and thereby a minimal spring constant. Adjacent its inner narrow end, each leaf spring 24 preferably has a boss 26.

Figure 3:
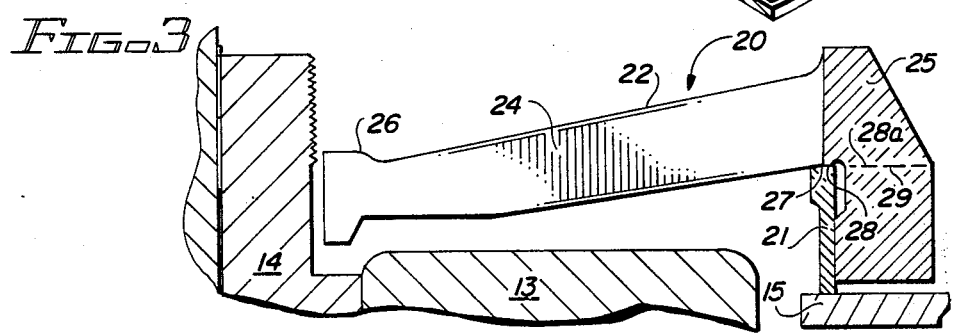
FIGS. 3 and 4 are fragmentary vertical sectional views of the clamp of FIG. 2 showing it in its uncompressed and compressed states, respectively.

According to an important feature of the invention, and as shown in FIG. 3, when the clamp is assembled, rim 25 overhangs spacer ring 21. Ring 21 supports clamp 20 at a series of contiguous points forming a circular line 27 around the inner end of a flat horizontal surface 28 of the rim that abuts the flat horizontal top of spacer ring 21. Surface 28, and hence line 27, lie in the same horizontal plane 28a as the centroid 29 of the cross-sectional area of ring 25; and because of the overhang, line 27 is also very near the centroid.

Figure 4:
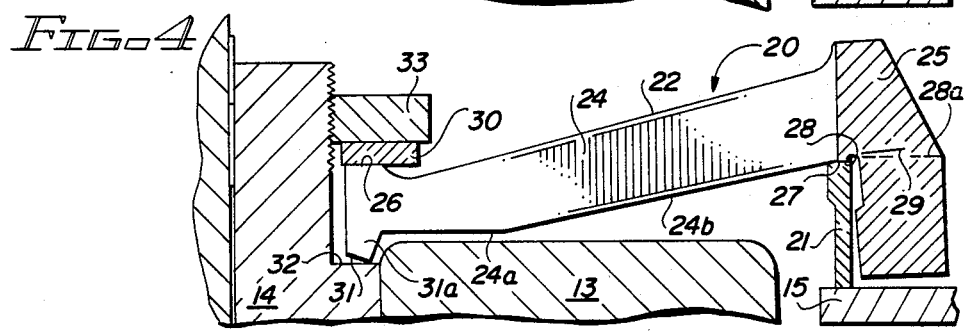

In operation, and as best shown in FIG. 4, when a clamp load of approximately 5,000 lbs. is applied to the leaf spring 24 at bosses 26 via a washer 30, a moment is transmitted to rim 25. This moment causes rim 25 to pivot or twist inwardly at and along line 27. As rim 25 pivots, the points of smallest radial motion are those near horizontal plane 28a.

By having rim 25 overhang spacer ring 21 and centroid 29 near the line 27 of contact points, the radial deflection of clamp 20 at this line is substantially eliminated; and hence the radial load transmitted to the top disk 15 via the spacer ring is substantially eliminated. This, in turn, substantially eliminates droop of the top disk 15 and stack as it is clamped under compression between hub flange 12 and spacer ring 21.

The under surfaces 31 of leaf springs 24 adjacent their inner end contact a shoulder 32 on spindle 14; and while the compression load is applied via washer 30, a clamping nut 33 is screw-threaded into contact with the washer to maintain the clamp 20 under compression and removably secure the clamped disk stack to the hub 13 and spindle 14.

It should be noted that, as illustrated, surface 31 adjacent the inner end of each leaf spring 24, is provided on a depending portion 31a of each leaf. The differences in angularity of surfaces 24a,b were to provide a substantially constant stress distribution across and along the leaf of each leaf spring 24. If preferred, spindle surface 32 could be higher than the upper surface of the hub, and the depending portion 31a eliminated. Irrespective of the specific configuration selected, however, it is essential that the stress be uniform across and throughout the length of each leaf of the leaf springs 24.

It will now be seen that the disk stack clamp herein described has a low spring constant and, by substantially eliminating radial load, desirably eliminates droop of the disks of the stack.

The foregoing and other changes may be made in the clamping apparatus and method herein described without departing from the spirit and scope of the invention. The configuration herein disclosed should therefore be considered as merely illustrative, and the invention should not be limited except as specified in the claims.

I claim:

1. A clamping means that acts through a spacer ring to clamp a stack of rigid disks in spaced parallel relationship to a hub having a portion supporting the lower end of the stack, said clamping means comprising:
    an annular member having a plurality of uniformly spaced radial slots to define a plurality of substantially identical tapered leaf springs; and
    each leaf spring terminating at its wider end in a common solid hoop-shaped rim that overhangs and contacts the spacer ring along a circular line in the same horizontal plane as, and near, the centroid of the cross-sectional area of the rim when the clamping means is uncompressed; and means for applying a compressive force on the small innermost ends of the leaf springs to clamp the disks to the hub.

2. The clamping means of claim 1, wherein each tapered leaf spring is configured to provide substantially uniform stress distribution across and along the tapered leaf spring, thereby to provide a minimal spring constant.

3. The clamping means of claim 1, wherein the rim of said clamping means is operative, upon application of the compressive force in an axial direction concurrently to the small innermost ends of all said leaf springs, to pivot at and along said circular line to substantially eliminate radial load transmitted via the spacer ring to the top disk when clamping the stack to the hub.

4. The clamping means of claim 3, including
    a spindle for driving the hub; and
    means bearing on said innermost ends to maintain the compressive force and secure the stack to the hub and spindle.

5. A rigid magnetic disk file, comprising
    a plurality of disks superposed in a stack;
    a plurality of spacers separating the disks;
    a spacer ring on the top disk of the stack;
    clamping means comprising an annular member having a plurality of uniformly spaced radial slots to define a plurality of substantially identical tapered leaf springs, each terminating at its wider end in a common solid hoop-shaped rim that surrounds and has overhanging contact with the spacer ring along a circular line that is in the same horizontal plane as and is near the centroid of the cross-sectional area of the rim when the clamping means is uncompressed; and
    a hub including a portion supporting the lower end of the stack;
    the rim of said clamping means being operative, upon application of a compressive force in an axial direction concurrently to the small innermost ends of all said leaf springs to pivot and twist inwardly at and along said circular line to substantially eliminate the radial load, thereby to clamp the stack to the hub in a manner in which disk droop is substantially eliminated.

6. The disk file of claim 5, wherein the configuration, including the taper, of the leaf springs provides substantially uniform stress distribution along and across the leaf springs for providing maximum vertical deflection for a preselected load and allowable stress level, and thereby a minimal spring constant.

7. The disk file of claim 5, wherein each leaf spring adjacent its innermost end has a boss, and including loading means via which the compressive force is applied to all bosses concurrently to reduce stress.

8. The disk file of claim 7, including a drive spindle surrounded by the hub, and wherein said loading means comprises a washer to which the force is applied, and a nut screw-threaded onto the spindle to maintain the compressive force and secure the stack to the hub and spindle.

9. A method of clamping a stack of rigid disks in spaced parallel relationship to a hub comprising the steps of:
    providing an annular member having a plurality of uniformly spaced radial slots to define a plurality of substantially identical tapered leaf springs, each terminating at its wider end in a common solid hoop-shaped rim;
    placing the annular member with its rim surrounding and in overhanging contact with a spacer above the top disk of the stack, such contact being at and along a circular line in a horizontal plane that is near and passes through the centroid of the cross-sectional area of the rim when the clamp is uncompressed; and
    concurrently applying a compressive force to the small ends of all leaf springs for pivotally twisting said rim at said circular line to substantially eliminate transmission of any radial load to the stack.

10. The method of claim 9, further including the step of securing the stack to the hub and drive spindle while under compression.

* * * * *